United States Patent [19]

Ellert

[11] 3,883,792

[45] May 13, 1975

[54] OPTIMUM CONTROL SYSTEM FOR MINIMIZING HARMONIC EFFECTS IN HVDC POWER CONVERTERS

[75] Inventor: Frederick J. Ellert, Broomall, Pa.

[73] Assignee: General Electric Company, Philadelphia, Pa.

[22] Filed: June 28, 1973

[21] Appl. No.: 374,682

[52] U.S. Cl. .................................. 321/9 R; 321/19
[51] Int. Cl. ............................................. H02m 1/12
[58] Field of Search ............ 321/5, 9, 10, 18, 40, 19

[56] References Cited
UNITED STATES PATENTS

| | | | |
|---|---|---|---|
| 3,329,883 | 7/1967 | Frierdich | 321/5 |
| 3,453,526 | 7/1969 | Bowles | 321/19 |
| 3,470,450 | 9/1969 | Eriksson et al. | 321/16 |
| 3,701,938 | 10/1972 | Chadwick | 321/5 X |
| 3,766,465 | 10/1973 | Reeve | 321/5 |
| R26,866 | 4/1970 | Storm | 323/4 |

Primary Examiner—William H. Beha, Jr.
Attorney, Agent, or Firm—J. Wesley Haubner; Albert S. Richardson, Jr.

[57] ABSTRACT

A real-time system for reducing the effects of harmonics reflected onto the a. c. supply line of a High Voltage Direct Current power converter by continuous measurement of various current and voltage fundamental, harmonic and d. c. components as reflected onto the supply line, calculation of an overall harmonic performance index based upon the necessary ones of the measured components, and on-line control of the firing angles at which various switching functions occur in the HVDC power converter to optimize the value of the performance index.

10 Claims, 4 Drawing Figures

3,883,792

OPTIMUM CONTROL SYSTEM FOR MINIMIZING HARMONIC EFFECTS IN HVDC POWER CONVERTERS

BACKGROUND OF THE INVENTION

1. Field of the Invention

This invention relates to HVDC power converters utilizing controllable switching devices or valves for converting alternating current (a. c.) to direct current (d. c.) power or vice versa, and more particularly to a system for minimizing characteristic harmonics resulting from this conversion and reflected onto the a. c. supply line by continuous optimization of the firing angles at which switching takes place.

2. Description of the Prior Art

There are previously proposed systems for adjusting the firing angles of valves in HVDC power converters to reduce the level of a given harmonic or component. It is believed that such adjustment, unless carefully done, tends to increase other harmonics and components, causing other undesirable effects. Also, it is possible to use large filters to prevent the harmonics from getting onto the supply line, but such filters are costly, bulky, and inefficient since they do not reduce the level of generation of such harmonics, but merely suppress them.

SUMMARY OF THE INVENTION

This invention includes a system for calculating a performance index value which indicates the total undesirable effect of the harmonics being generated. An optimizer attempts to maintain this performance index at its minimum attainable value by interrelated control of the firing angles at which respective valves in the power converter operate.

Such interrelated control according to a total performance index avoids the problem which occurs when the values are adjusted independently one at a time, whereby other values often are made worse as the one being controlled is improved.

DESCRIPTION OF THE PREFERRED EMBODIMENT

There are three known and widely accepted performance index equations, and the choice of an equation depends upon what features of the harmonic generation are considered most disturbing. The use of these equations and the choice of a proper equation is well-known in the art.

In the following equations, $E_n$ is $rms$ value of $n^{th}$ harmonic of voltage.

$I_n$ is $rms$ value of $n^{th}$ harmonic of current.

$F_n$ is a weighting factor for the $n^{th}$ harmonic.

M is the highest harmonic of importance.

A first performance factor $P_1$ can be calculated as an index of the telephone interference factor (TIF), according to the following equation:

$$P_1 = \sqrt{\sum_{n=1}^{n=M} \left(\frac{E_n \cdot F_n}{E_1}\right)^2} \quad \text{(Eqn 1)}$$

A second performance factor $P_2$ can be calculated as an index of the so-called IT factor indicating current harmonics, according to the following equation:

$$P_2 = \sqrt{\sum_{n=1}^{n=M} \left(I_n \cdot F_n\right)^2} \quad \text{(Eqn 2)}$$

A third performance factor $P_3$, called the voltage distortion factor D, provides a total percentage harmonic voltage distortion, and can be calculated according to the following equation:

$$P_3 = \sum_{n=2}^{n=M} \left(\frac{E_n}{E_1} \cdot 100\%\right) \quad \text{(Eqn 3)}$$

Whichever one of the factors $P_1$, $P_2$ or $P_3$ is most critical for a given application can be chosen as the performance index to be optimized. The square root functions in $P_1$ and $P_2$ need not be calculated, because the optimal values of $P_1^2$ and $P_2^2$ respectively correspond to the optimal values of $P_1$ and $P_2$, so that $P_1^2$ and $P_2^2$ can be effectively optimized. The weighting factors are assigned by the user according to the relative disturbance caused by a given harmonic.

Figure 2:
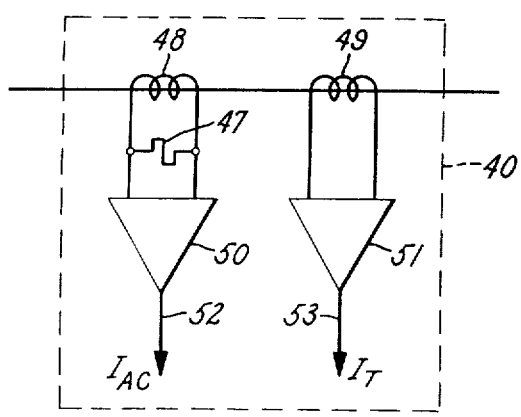
FIG. 2 is a diagram of a current detecting element for use in the system of FIG. 1.

In order to prevent saturation in the converter transformer, it also is desirable to reduce the d. c. components of the currents in the secondary windings to a negligible amount. Consequently, the performance index used for any particular HVDC system should contain a term that is functionally dependent on the d. c. currents in the transformer secondary windings, namely $I_{T,1}$, $I_{T,2}$—obtained from suitable current sensing means such as shown in FIG. 2. For example, if it is assumed that the TIF (Eqn 1) is most important for a particular systems application, then the performance index P could take the following form:

$$P = \sum_{n=1}^{n=m} \phi_n \left( \frac{E_n \cdot F_n}{E_1} \right)^2 + \phi_T \sum_{p=1}^{p=Q} I_{T,p}^2 \quad \text{(Eqn 4)}$$

where:

$\phi_n$ is the weighting function associated with the $n^{th}$ harmonic, $\phi_T$ is the weighting function associated with the d. c. currents in the transformers, Q is the total number of transformer currents that can be influenced by the control.

The weighting functions, $\phi_n$ and $\phi_T$, can be selected (and even adjusted during the operation of the HVDC system) to best meet the application needs. For example, if the TIF alone is important, set $\phi_n = 1$ and $\phi_T = 0$. If the a. c. system is resonant to the fourth harmonic frequency, set $\phi_4 = 10$ and all other $\phi_n$'s equal to 1. It is also possible to adjust the weighting factors on-line as a function of system conditions. For example, initially set $\phi_T = 0$ and $\phi_n = 1$. Let the control system adjust the firing angles until P is well within the prescribed limits. Then increase $\phi_T$ until the harmonic terms in the performance index approach the prescribed upper limit. The form of the performance index provides reasonable flexibility to meet a wide range of system requirements.

Figure 1:
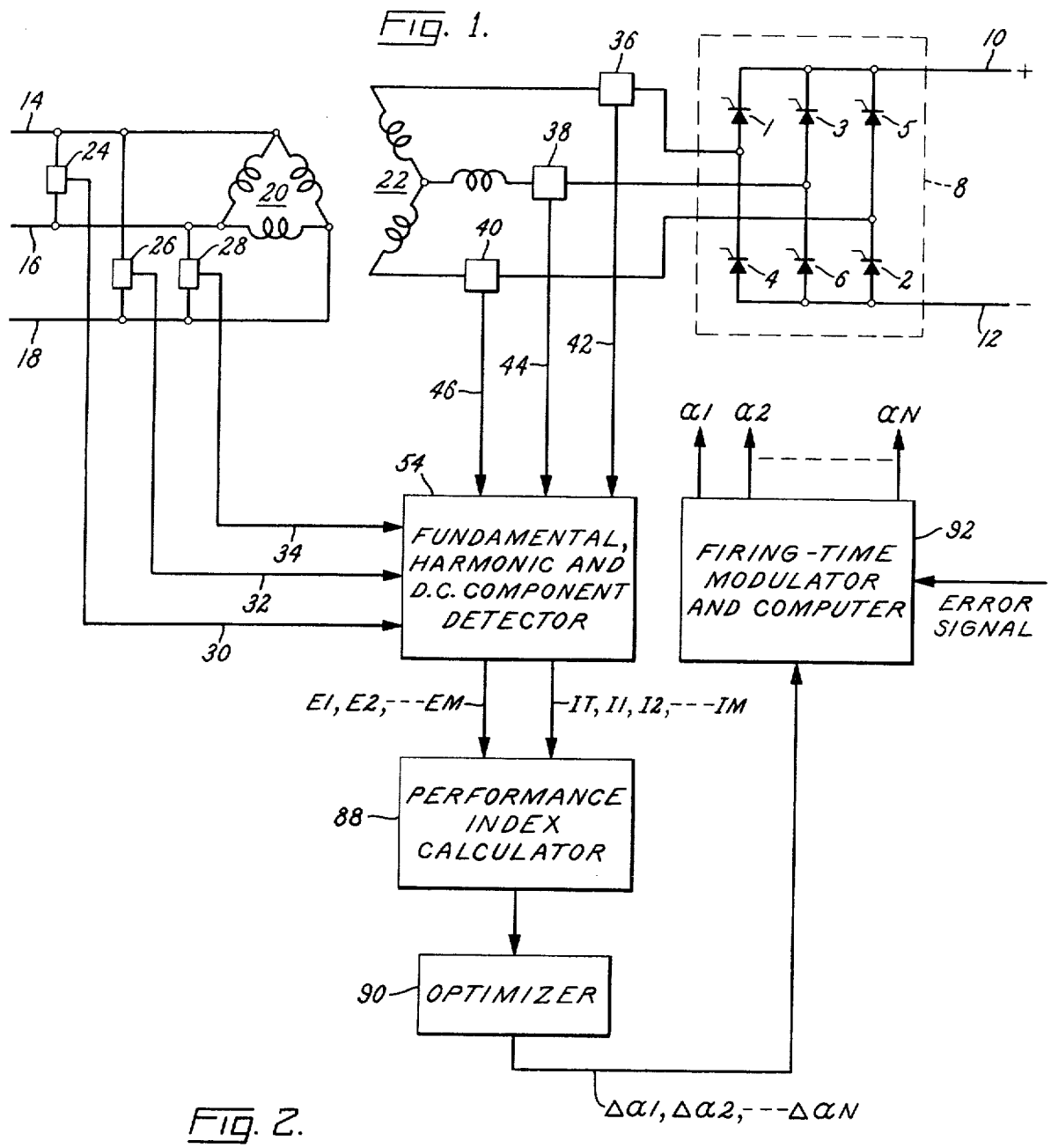
FIG. 1 is a schematic block diagram of a circuit according to the present invention for minimizing harmonic effects in HVDC power converters.

In FIG. 1, six controllable electric current conducting valves 1, 2, 3, 4, 5, and 6 are connected as switch elements to form a 6-pulse bridge 8 in an HVDC power converter. While only a single converter employing six switching devices is shown, it is believed obvious that multiple converters using additional bridges in a 12, 18, 24, etc. pulse arrangement could be employed equally well with the invention. For extra high voltage and extra high current applications, each of the switch elements preferably comprises a plurality of solid-state controlled rectifiers (thyristors) interconnected in series and parallel arrays and arranged to operate in unison.

The illustrated valves 1-6 are periodically fired in numerical sequence in timed relation to a cycle of the alternating voltage appearing on the a. c. electric power lines 14, 16, and 18. The firing angles at which these valves respectively are switched from nonconducting to conducting states is controllable so as to supply a voltage of desired average magnitude to d. c. lines 10 and 12 (rectifier mode), or alternatively to supply alternating current through transformer 20–22 to the a. c. side of the system by inverting d. c. potential applied to lines 10 and 12 (inverter mode). The present invention can be employed with HVDC power converters operated in either the rectifier mode or inverter mode. For convenience, operation in only the rectifier mode will be described; however, the manner of operation of the system comprising the invention is the same for HVDC power converters operated in the inverter mode.

Three-phase sinusoidal a. c. power having a fundamental frequency such as 60 Hertz is derived from supply lines 14, 16, and 18 and is applied to a primary transformer winding 20, illustrated in this embodiment as delta-connected. A secondary transformer winding 22, illustrated as wye-connected, provides a three-phase a. c. output to the HVDC power bridge 8.

Voltage sensors 24, 26 and 28 are connected between pairs of the polyphase a. c. power lines 14, 16 and 18 to derive and provide on lines 30, 32 and 34 signals instantaneously proportional to the voltage waveforms across the respective power lines. The voltage sensors must have a bandwidth wide enough to cover all of the harmonics which are of interest, perhaps from d. c. to the 25th harmonic.

In similar fashion, current sensors 36, 38 and 40 are connected to provide signals on lines 42, 44 and 46 which are instantaneously proportional to the current waveform of each phase, respectively, over a similar bandwidth. Each of the current sensors can be constructed, as shown in FIG. 2, in the form of a pair of current transformers 48 and 49 inductively coupled to the conductor for the associated phase of the converter transformer secondary windings 22 in FIG. 1. A resistor 47 is connected across the secondary of the a. c. current transformer 48, and the voltage drop across this resistor is amplified by an amplifier 50 to thereby develop a proportional signal on output line 52. The companion transformer 49 supplies another amplifier 51 and is arranged to develop on output line 53 a signal representative of any d. c. component of line current. Consequently the current sensor 40 that is illustrated in FIG. 2 derives signals which are replicas, respectively, of the total a. c. current in one phase of the power system and of the d. c. component thereof.

The signals on lines 30, 32, 34, 42, 44, and 46 are applied to a detector 54 for detecting the fundamental value, various harmonic values, and the d. c. component of the system voltages and currents, as generally designated $E_n$, $I_n$ and $I_T$. Various detector arrangements are possible; one example of such is illustrated in FIG. 3.

Figure 3:
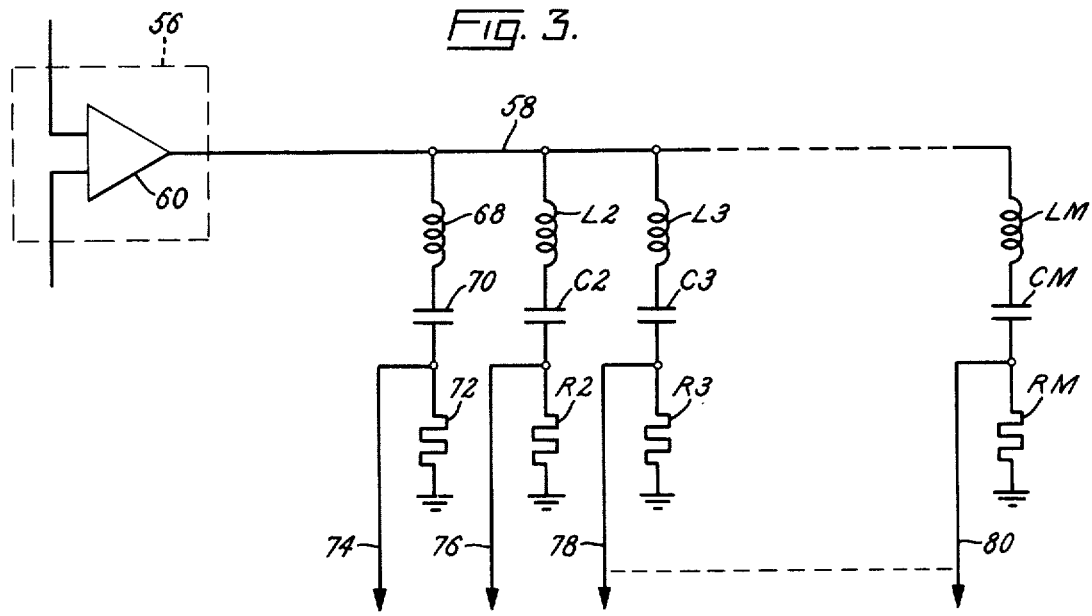
FIG. 3 is a diagram of a harmonic detector for use in the system of FIG. 1.

FIG. 3 illustrates a detector for harmonic analysis of the signal on the output line 58 of a voltage sensor 56 which is shown as an amplifier 60 having two inputs respectively coupled to a pair of the power lines. Connected to output line 58 are a number of tuned circuits used for harmonic analysis. The first circuit includes an inductor 68 and a capacitor 70 connected as a series LC circuit and tuned to the fundamental or first harmonic frequency. A resistor 72 is used to develop the first harmonic output on line 74. An inductor $L_2$ and a capacitor $C_2$ form another LC circuit tuned to the second harmonic for developing the second harmonic signal across resistor $R_2$ and on line 76. Similarly, the third harmonic is provided on line 78, and so on, to the $M^{th}$ harmonic on line 80.

Similar provisions may be made for detecting harmonics at the output of the amplifier 50 of each current sensor by treating the output signal in a manner similar to that described in the preceding paragraph to derive the current harmonic proportional signals. Depending upon the method of control being used, it may be desirable to rectify the harmonic indications by amplitude detection and to sum the rectified values for a given harmonic for all phases before entering the data into the performance index equation. Or, if each phase is to be separately controlled, the harmonic data from each phase can be separately considered.

Figure 4:
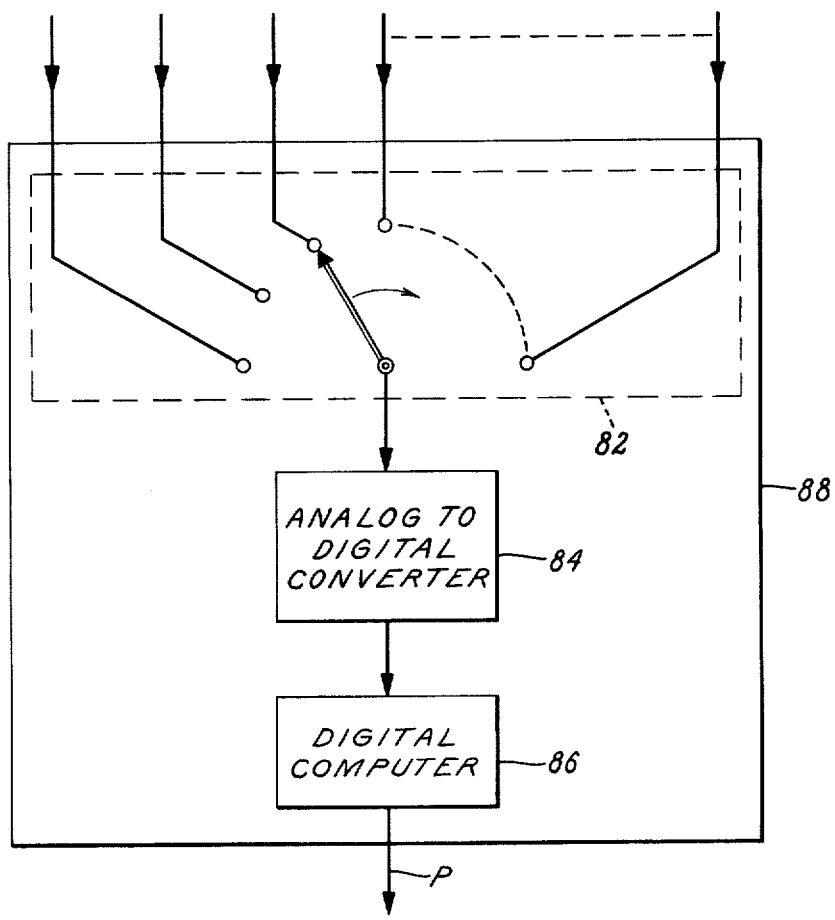
FIG. 4 is a diagram of a performance index calculator for use in the system of FIG. 1.

In FIG. 4, a multiplexer 82 receives various parallel analog signals representative of different harmonic values, etc., and applies them in multiplex to an analog-to-digital converter 84 for application to suitable digital logic means 86 for solving one or more of the performance equations such as given above, using the digital input data for the parameters of the equations. Thus, units 82, 84 and 86 comprise one version of a performance index calculator 88. The digital circuitry 86 could be an appropriately programmed computer if desired. Other kinds of computers such as an analog computer, could perform the same function.

Once calculator 88 calculates the performance index values P, the values of P must be optimized by optimizer 90 in accordance with a desired weighting factor selected by the user in accordance with his own requirements and special problems. There are a variety of well-known methods for finding the bottom of an N-dimensional valley (analogous to hill-climbing). These methods include direct search, steepest ascent, optimum gradient, conjugate gradient, etc.

In the preferred embodiment, the optimizer uses the optimum gradient method to control the firing-time modulator and computer 92, which in turn controls the firing angles $\alpha 1, \alpha 2, \ldots, \alpha N$ of the various valves in the HVDC power converter bridge 8 to optimize the performance index factors P in accordance with the predetermined optimization program. The construction of firing-time modulators for use with HVDC power converters is well-known in the art and need not be described in detail. The error control from optimizer 90 is applied to such a modulator to control the output voltage and current of the HVDC power converter.

Optimizer 90 provides control signals to firing-time modulator 92 to control and vary the various firing angles. As a first step, the optimizer perturbs each firing angle independently by an amount $\Delta\alpha$ to determine the effect on the value of the performance index P. Then, a gradient direction is determined in which to adjust all the firing angles, and in which direction, at least initially, the greatest improvement in the value of P can be made. The values of $\alpha$ are stepped in this gradient direction, and after each step, the value of P is calculated and compared with the value which existed before the last step occurred. As long as each step results in even a slight decrease in the value of P, no new gradient is calculated. When the optimizer determines that it has obtained the best possible value using a given gradient direction, it stops using that gradient and calculates the direction of a new gradient by perturbing the firing angles again. This process may be repeated indefinitely to hold an optimum value or, if it may be assumed that the optimum value has a stable location, the process may be discontinued once the optimum value is obtained. The optimizer recognizes an optimum value by the fact that it cannot perturb any firing angle and thereby improve the value of P. This process is known as the optimum gradient method, and methods for carrying it out are well-known.

Thus, the system independently changes the firing angles of the various valves 1–6 so that the value of P is gradually minimized. Thus the value of the performance index is maintained at the best value attainable for the necessary output level.

Many variations are within the scope of this invention. If the fundamental power frequency is not stable at its nominal value, say 60Hz, but varies because of some change at the generating plant, then the voltage and current harmonic detectors must be adjusted to choose the proper harmonics of the new fundamental. Gang-tuned inductances or gang-tuned capacitances responsive to a frequency sensing device could be used in the circuit of FIG. 3 to follow a varying fundamental frequency. Alternatively, active filters could be used in lieu of the passive ones illustrated. Other variations will occur to a skilled artisan which are within the scope of the invention as defined by the appended claims.

What I claim as new and desire to secure by U.S. letters patent is:

1. In a system for controlling HVDC power converters connected to alternating voltage electric power lines, the HVDC converters comprising a plurality of controllable electric current conducting valves arranged to be periodically fired in a predetermined sequence in timed relation to the alternating voltage cycle, the firing angles at which said valves respectively are switched from nonconducting to conducting states being controllable, the alternating voltage on said lines having a certain fundamental frequency and a plurality of harmonic components which occur therein due to the switching action of said valves, the improvement comprising:

a. detecting means for detecting said harmonic components of the alternating voltage on said lines and for providing an electrical representation of the magnitude of each of said harmonic components, b. calculating means responsive to said electrical representations for calculating performance indexes representing the degree of undesirability of a certain intensity of harmonic component occurrence, and c. control means responsive to said performance indexes operating to vary the relative firing angles of the respective ones of said valves for changing the value of said performance indexes toward an optimum value, thereby minimizing the undesirable effects of said harmonic component occurrence.

2. A system according to claim 1 wherein said electric power lines comprise a polyphase alternating current system and wherein valves are provided for each phase thereof.

3. A system according to claim 2 wherein said valves are controlled rectifier devices and the system further includes firing time modulator means controlling the controlled rectifier devices and responsive to the control means for firing the controlled rectifier devices at firing angles controlled by said control means.

4. A system according to claim 3 wherein said detecting means comprises a plurality of tuned circuits tuned to pass signals of various harmonic frequencies and connected to measure harmonic values of current and voltage in each phase of the polyphase system, thereby providing said electrical representations representative of the harmonic values in each phase of the polyphase system.

5. A system according to claim 4 wherein said calculating means comprises:

i. analog to digital converter means responsive to the electrical representations of the harmonic values for providing digital signals representative of the harmonic values, and ii. digital logic means responsive to said digital signals for solving equations including said digital signal values as parameters to derive said performance indexes.

6. A system according to claim 5 wherein said control means includes an optimizer responsive to the calculating means output and controlling said firing time modulator means in conjunction with other control inputs to the firing time modulator for optimizing the values of the performance indexes in accordance with a preset weighted program determined by user requirements.

7. A system according to claim 6 wherein the HVDC converters include a power transformer connected to said polyphase system and the performance indexes calculated by the calculating means include at least a term that is functionally dependent on the d. c. components in the transformer secondary windings, a telephone interference factor (TIF), a current harmonic factor (IT) and a voltage distortion factor (D) calculated according to the following equations:

$$P_1 = \sqrt{\sum_{n=1}^{n=M} \left(\frac{E_n \cdot F_n}{E_1}\right)^2} \quad \text{(Eqn 1)}$$

$$P_2 = \sqrt{\sum_{n=1}^{n=M} \left(I_n \cdot F_n\right)^2} \quad \text{(Eqn 2)}$$

$$P_3 = \sum_{n=2}^{n=M} \left(\frac{E_n}{E_1} \cdot 100\%\right) \quad \text{(Eqn 3)}$$

where
$E_n$ is the r.m.s. value of the $n$th harmonic of voltage
$I_n$ is the r.m.s. value of the $n$th harmonic of current
$F_n$ is a weighting factor for the $n$th harmonic
M is the highest harmonic of importance.

8. A system according to claim 2 wherein said control means includes an optimizer responsive to the calculating means and controlling the relative firing angles of the respective ones of said valves for changing the value of the performance indexes toward an optimum value.

9. A system according to claim 8 wherein the performance indexes calculated by the calculating means include at least a telephone interference factor (TIF), a current harmonic factor (IT) and a voltage distortion factor (D) calculated according to the following equations:

$$P_1 = \sqrt{\sum_{n=1}^{n=M} \left(\frac{E_n \cdot F_n}{E_1}\right)^2} \quad \text{(Eqn 1)}$$

$$P_2 = \sqrt{\sum_{n=1}^{n=M} \left(I_n \cdot F_n\right)^2} \quad \text{(Eqn 2)}$$

$$P_3 = \sum_{n=2}^{n=M} \left(\frac{E_n}{E_1} \cdot 100\%\right) \quad \text{(Eqn 3)}$$

where
$E_n$ is the r.m.s. value of the $n$th harmonic of voltage
$I_n$ is the r.m.s. value of the $n$th harmonic of current
$F_n$ is a weighting factor for the $n$th harmonic
M is the highest harmonic of importance.

10. A system according to claim 9 wherein the performance indexes calculated by the calculating means further include a term that is functionally dependent on any d. c. component of the alternating currents in addition to the TIF, the IT and D factors.

* * * * *